(12) United States Patent
Flick

(10) Patent No.: US 10,127,174 B2
(45) Date of Patent: Nov. 13, 2018

(54) MULTI-ADAPTOR VEHICLE TRACKER CONTROLLER AND ASSOCIATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 382 days.

(21) Appl. No.: 14/944,497

(22) Filed: Nov. 18, 2015

(65) Prior Publication Data

US 2017/0139868 A1    May 18, 2017

(51) Int. Cl.
| | |
|---|---|
| G06F 13/40 | (2006.01) |
| G01S 19/16 | (2010.01) |
| G06F 13/42 | (2006.01) |
| G01S 19/42 | (2010.01) |
| G06F 13/10 | (2006.01) |

(52) U.S. Cl.
CPC ......... *G06F 13/4068* (2013.01); *G01S 19/16* (2013.01); *G01S 19/42* (2013.01); *G06F 13/102* (2013.01); *G06F 13/4282* (2013.01)

(58) Field of Classification Search
CPC ......... G08G 1/20; G06F 13/4068; H04M 1/00
USPC .......................................................... 710/72
See application file for complete search history.

(56) References Cited

U.S. PATENT DOCUMENTS

| | | | | |
|---|---|---|---|---|
| 4,383,242 | A | | 5/1983 | Sassover et al. |
| 4,649,385 | A | * | 3/1987 | Aires ................... G07C 9/00111 340/8.1 |
| 5,146,215 | A | * | 9/1992 | Drori ................... B60R 25/1004 340/426.14 |
| 5,252,966 | A | | 10/1993 | Lambropoulos et al. |
| 5,898,391 | A | * | 4/1999 | Jefferies ................ B60R 25/102 340/426.16 |
| 6,331,825 | B1 | * | 12/2001 | Ladner .................. B60R 25/102 340/988 |

(Continued)

OTHER PUBLICATIONS

U.S. Appl. No. 14/944,507, filed Nov. 18, 2015.

*Primary Examiner* — Farley Abad
*Assistant Examiner* — Getente A Yimer
(74) *Attorney, Agent, or Firm* — Allen, Dyer, Doppelt + Gilchrist, P.A.

(57) ABSTRACT

A vehicle tracker system for a vehicle including a data communications bus extending throughout the vehicle may include a multi-adaptor vehicle tracker controller including a position determining device, a wireless communications device, a controller data link interface, a download learning port, and a processor. The processor may communicate geolocation data via the wireless communications device. A data bus adaptor may adapt the tracker controller to communicate via the data communications bus and include an adaptor data link interface coupled to the controller data link interface. The data bus adaptor may be operable with a given set of proprietary remote function controller codes. The processor may be operable with different sets of proprietary remote function controller codes, and determine the given set of proprietary codes based upon the download learning port and use the given set of proprietary codes for communications with the data bus adaptor.

32 Claims, 6 Drawing Sheets

(56) References Cited

U.S. PATENT DOCUMENTS

| | | |
|---|---|---|
| 6,346,876 B1 | 2/2002 | Flick |
| 6,756,885 B1 | 6/2004 | Flick |
| 8,362,886 B2 | 1/2013 | Flick |
| 2002/0008645 A1 | 1/2002 | Flick et al. |
| 2005/0192746 A1* | 9/2005 | King ........................ G01C 21/26 701/468 |
| 2005/0242929 A1* | 11/2005 | Onishi ..................... B60R 25/04 340/426.17 |
| 2007/0015548 A1* | 1/2007 | Flick ......................... G08G 1/20 455/569.2 |
| 2010/0214096 A1* | 8/2010 | Cheng ..................... B60R 25/00 340/539.32 |
| 2011/0257812 A1* | 10/2011 | Carpenter ............. G01S 5/0027 701/2 |

\* cited by examiner

MULTI-ADAPTOR VEHICLE TRACKER CONTROLLER AND ASSOCIATED METHODS

TECHNICAL FIELD

The present application is related to the field of computer networks, and, more particularly to computer networks and security device for vehicles and associated methods.

BACKGROUND

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle. The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

In addition to vehicle security and remote keyless entry functions, another type of desirable vehicle remote control function is remotely starting the vehicle engine when the owner is away from the vehicle. Such remote starting can be used in cold climates to warm the engine and/or run the passenger compartment heater, to thereby prevent freezing or for the user's comfort. Conversely, remote engine starting can enable the air conditioning to run to cool the vehicle's interior before the vehicle user enters the vehicle.

Unfortunately, many older vehicle security systems needed to be directly connected by wires to individual vehicle devices, such as the vehicle horn or door switches of the vehicle. In other words, older conventional vehicle security systems were hard-wired to various vehicle components, typically by splicing into vehicle wiring harnesses or via interposing T-harnesses and connectors. More recently, vehicle manufacturers have moved to decrease the wiring complexity by using one or more data buses extending throughout the vehicle and interconnecting various vehicle devices. Moreover, the assignee of the present invention has made a number of significant developments in the vehicle data bus area, particularly as may be helpful to the adaptation of aftermarket vehicle remote control systems to vehicles including a data bus. For example, some of these innovations are disclosed in U.S. Pat. Nos. 6,756,885 and 6,346,876, the entire disclosures of which are incorporated herein by reference.

Indeed, one of the significant advances disclosed in the Flick patents is the concept of a multi-vehicle compatible controller that may be provided by using a conventional remote control device coupled to the data bus by a data bus adaptor device. The data bus adaptor device is able to translate the codes or language generated by the vehicle devices on the data bus into a format that may be read by the remote control device, and/or is able to translate command information or codes from the remote control device into data bus codes to control the vehicle devices.

Despite the advances provided by the migration of manufacturers to vehicle data bus technology, and the significant advances provided by the Flick patents for multi-vehicle compatibility with the data bus, there are still other compatibility shortcomings that may need further efforts. In particular, manufacturers of aftermarket security and remote start systems may be using proprietary output formats, such as in the form of coded serial outputs that will interface with their own data bus modules, but not with the data bus modules of other manufacturers.

One particular approach which helps address such compatibility shortcomings is set forth in U.S. Pat. No. 8,362,886, also to Flick, which is hereby incorporated herein in its entirety by reference. This patent is directed to a remote control system for a vehicle of a type including a data communications bus extending throughout the vehicle and connecting a plurality of vehicle devices within the vehicle may include a remote transmitter and a vehicle remote function controller being responsive to the remote transmitter. The vehicle remote function controller may include a controller data link interface. The remote control system may include a multi-controller data bus adaptor for adapting the vehicle remote function controller to communicate via the data communications bus and may include an adaptor data link interface coupled to the controller data link interface. The multi-controller data bus adaptor may be operable with a given set of controller codes for the vehicle remote controller from among a plurality of different sets of controller codes for a plurality of different vehicle function controllers.

Despite the existence of such configurations, further developments may be desirable for dealing with compatibility issues as between different components to be connected to a vehicle data bus which use different proprietary communication formats.

SUMMARY

In view of the foregoing background, it is therefore an object to provide a multi-adaptor vehicle tracker controller for a vehicle including a data communications bus.

This and other objects, features, and advantages may be provided by a vehicle tracker system for a vehicle of a type including a data communications bus extending throughout the vehicle and connecting a plurality of vehicle devices within the vehicle. The vehicle tracker system may include a multi-adaptor vehicle tracker controller including a position determining device for determining a geolocation of the vehicle, a wireless communications device, a controller data link interface, a download learning port, and a processor coupled to the position determining device, the wireless communications device, and the controller data link interface. The processor may be for communicating geolocation data via the wireless communications based upon the position determining device. The system may also include a data bus adaptor for adapting the multi-adaptor vehicle tracker controller to communicate via the data communications bus and including an adaptor data link interface coupled to the controller data link interface. The data bus adaptor may be operable with a given set of proprietary remote function controller codes from among a plurality of different sets of proprietary remote function controller codes. Moreover, the processor may be operable with the different sets of proprietary remote function controller codes, and configured to determine the given set of proprietary remote function controller codes that the data bus adaptor is operable with based upon the download learning port and use the given set of proprietary remote function controller codes for communications with the data bus adaptor.

More particularly, the multi-adaptor vehicle tracker controller may further include a memory coupled to the processor for storing the given set of proprietary remote function controller codes. Furthermore, the controller data link interface and the adaptor data link interface may establish a serial data communications link therebetween. By way of example, the position determining device may include Global Positioning System (GPS) receiver, and the wireless communications device may be a cellular communications device. In addition, the multi-adaptor vehicle tracker controller may have a first housing, and the data bus adaptor may have a second housing.

A related multi-adaptor vehicle tracker controller, such as the one described briefly above, and a related method for using a vehicle tracker system are also provide. In accordance with one example embodiment, the processor of the multi-adaptor vehicle tracker controller comprising may be configured to determine the given set of proprietary remote function controller codes that the data bus adaptor is operable with based upon at least one code from the data bus adaptor.

DETAILED DESCRIPTION OF THE EMBODIMENTS

The present invention will not be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar element or steps in different embodiments.

Figure 1:
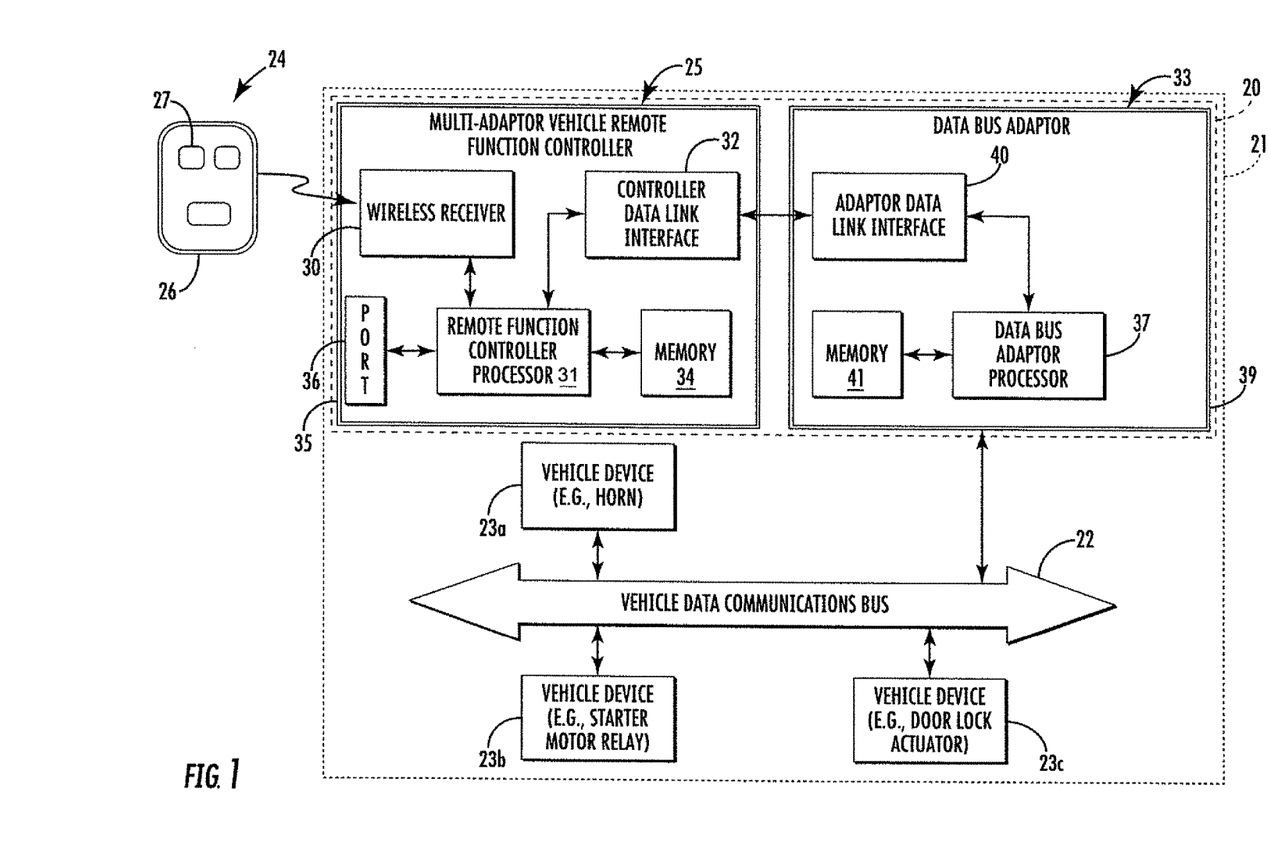
FIG. 1 is a block diagram of a vehicle remote control system in accordance with an example embodiment including a multi-adaptor vehicle remote function controller.

Referring initially to FIG. 1, a remote control system 20 is for a vehicle 21 of a type illustratively including a data communications bus 22 extending throughout the vehicle and connecting a plurality of vehicle devices 23a-23c within the vehicle 21. For example, such vehicle devices 23a-23c may be associated with the vehicle horn, starter motor relay(s), and door lock actuator. Other examples of vehicle devices may include headlight relays, sirens, or one or more vehicle sensors. Those skilled in the art will recognize other vehicle devices that may also be connected to the data bus 22.

The remote control system 20 illustratively includes a remote transmitter 24 and a multi-adaptor vehicle remote function controller 25 being responsive to the remote transmitter. The remote transmitter 24 may be a small portable unit including a housing 26, function control switches 27 carried by the housing, and a battery within the housing and associated transmitter circuitry (not shown). This type of remote handheld transmitter is commonly used in conventional vehicle security systems, remote start systems, and remote keyless entry systems, for example. The communications from the remote transmitter 24 to the remote function controller 25 at the vehicle is typically a direct radio frequency link, that is, there is no intervening communications links. However, in other embodiments, the remote transmitter 24 may indirectly communicate with the remote function controller 25 via other communications infrastructure, such as via satellite, or cellular communications, via the public switched telephone network (PSTN) and/or over the world wide web or Internet, as will be appreciated by those skilled in the art. Other devices such as smartphones, etc., may also be used as remote transmitters in some embodiments.

The remote transmitter 24 may also be a passive transponder type device, that takes power from an associated transponder reader, as will be appreciated by those skilled in the art, and automatically transmits a signal to the reader. For example, the transponder may be of the type carried in conjunction with the vehicle keys, or may be integrated with the key as will be readily appreciated by those skilled in the art.

The remote transmitter 24 may also include one or more central station transmitters, such as may be provided by a satellite transmitter or cellular telephone transmitter, for example. Such a central station transmitter may also be connected to other communications infrastructure.

The remote function controller 25 illustratively includes a wireless receiver 30 and a vehicle function controller processor 31 coupled thereto. The processor 31 is coupled to a controller data link interface 32 that, in turn, is connected to the data bus adaptor 33. A vehicle remote function controller memory 34 is also coupled to the processor 31. Although the vehicle remote function controller memory 34 is illustrated as a separate device, those skilled in the art will recognize that the memory may in some embodiments be embedded on the same integrated circuit as the processing circuitry of the vehicle remote function controller processor 31. The remote function controller 25 further illustratively includes a first housing 35, and a download learning port 36 carried by the first housing and coupled to the processor 31.

The data bus adaptor 33 illustratively includes a second housing 39. This data bus adaptor 33 is for adapting the multi-adaptor vehicle remote function controller 25 to communicate via the data communications bus 22. The data bus adaptor 33 illustratively includes a data bus adaptor processor 37 coupled to an adaptor data link interface 40 which cooperates therewith to communicate with the controller data link interface 32. Communication between the controller data link interface 32 and the adaptor data link interface 40 may be established via a serial data communications link, for example. The serial data communications link is often a proprietary digital link or format for respective different manufacturers of the data bus adaptor 33.

More particularly, the data bus adaptor 33 may only be operable with a single given set of controller codes for a respective vehicle remote function controller of the same manufacturer as the data bus adaptor. However, the processor 31 of the multi-adaptor vehicle remote function controller 25 may advantageously be operable with a plurality of different sets of controller codes for a plurality of different remote vehicle controllers (e.g., from different manufacturers). As a result, the multi-adaptor vehicle remote function controller 25 thereby provides compatibility with different manufacturers' data bus adaptors 33, despite those data bus adaptors being configured to only operate with a single set of proprietary controller codes.

Figure 2:
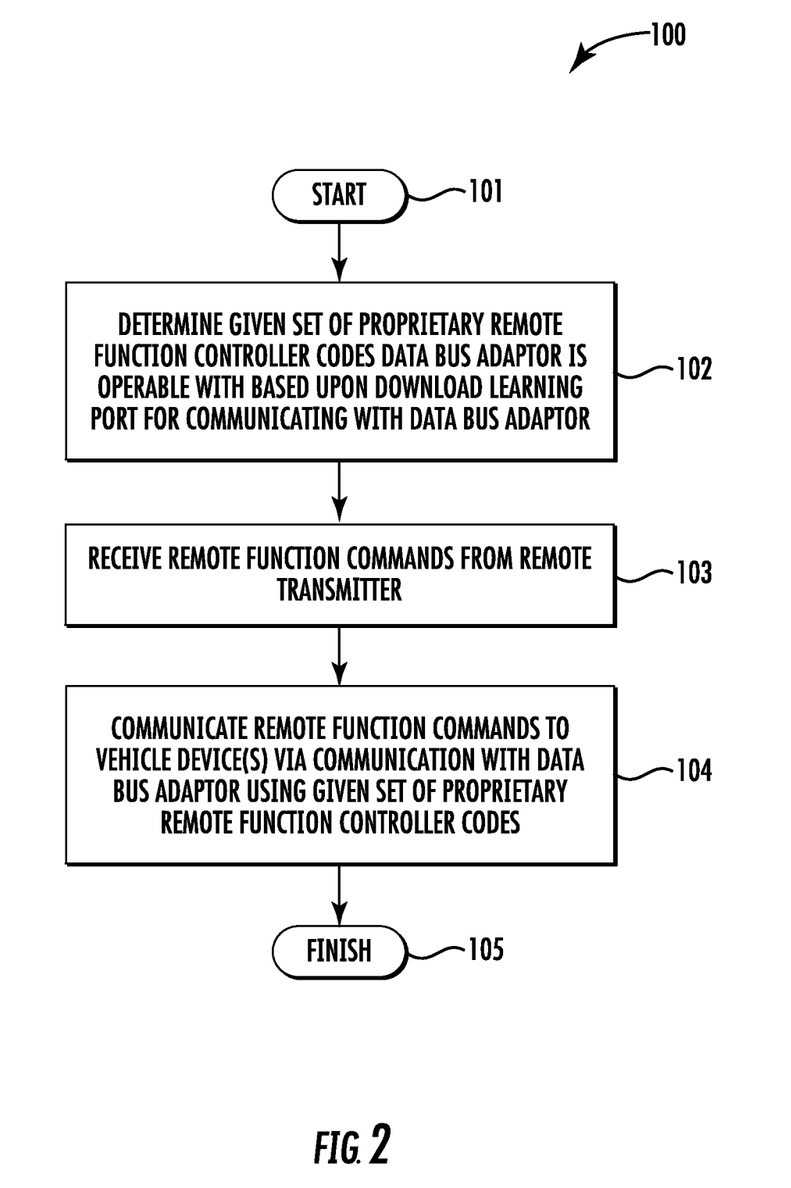
FIGS. 2 and 3 are flow diagrams illustrating method aspects associated with the system of FIG. 1.

With reference to the flow diagram 100 of FIG. 2, beginning at Block 101, the desired set of controller codes may be obtained via the download learning port 36, for example, at Block 102. The download learning port 36 illustratively cooperates with the remote function controller processor 31 for learning or having downloaded thereto the given set of controller codes. For example, the download learning port 36 may be coupled to a wired or wireless connection (such as a cellular, Bluetooth or Wi-Fi link) to allow learning of the controller codes via a laptop, the Internet, a cellular connection, or other approaches, as will be appreciated by those skilled in the art. In some embodiments, the port 36 may also be used to connect the controller data link interface 32 to the adaptor data link interface 40 (e.g., the port may be a USB or other similar universal port), although the controller data link interface may also have its own dedicated port for communicating with the adaptor data link interface as well. In some embodiments, the port 36 may be a PCB port or internal PCB track connection, for example.

Thereafter, the multi-adaptor vehicle remote function controller 25 may advantageously receive remote function commands from the remote transmitter 24, at Block 103, and communicate with the data bus adaptor 33 using the given set of proprietary remote function controller codes to control one or more of the vehicle devices 23a-23c, for example, at Block 104. More particularly, responsive to the controller codes from the remote function controller 25, the data bus adaptor 33 may communicate the appropriate vehicle device codes to communicate with the vehicle devices 23a-23c on the data bus 22. The method of FIG. 2 illustratively concludes at Block 105.

Turning now to another advantageous feature of the system 20, the data bus adaptor 33 may operate with a desired set of vehicle device codes from among a plurality of different sets of vehicle device codes for different vehicles. The vehicle device codes may be unique to each vehicle or vehicle manufacturer. In some embodiments, the data bus adaptor 33 may also include a download learning port (not shown) to learn the desired set of vehicle device codes, similar to the way in which the processor 31 learns the given set of controller codes via the download learning port 36, as will be appreciated by those skilled in the art.

Learned vehicle device codes (as well as controller codes) may be stored in a memory 41 of the data bus adaptor 33 which is coupled to the processor 37. The memory 41 may be a plug-in IC, a PROM chip, a removable FLASH memory, SD (or micro SD) card or any other memory, as will be appreciated by those skilled in the art. Although the memory 41 is illustrated as a separate device, those skilled in the art will recognized that the memory may here again be embedded on the same integrated circuit as the processing circuitry of the data bus adaptor processor 37.

Figure 3:
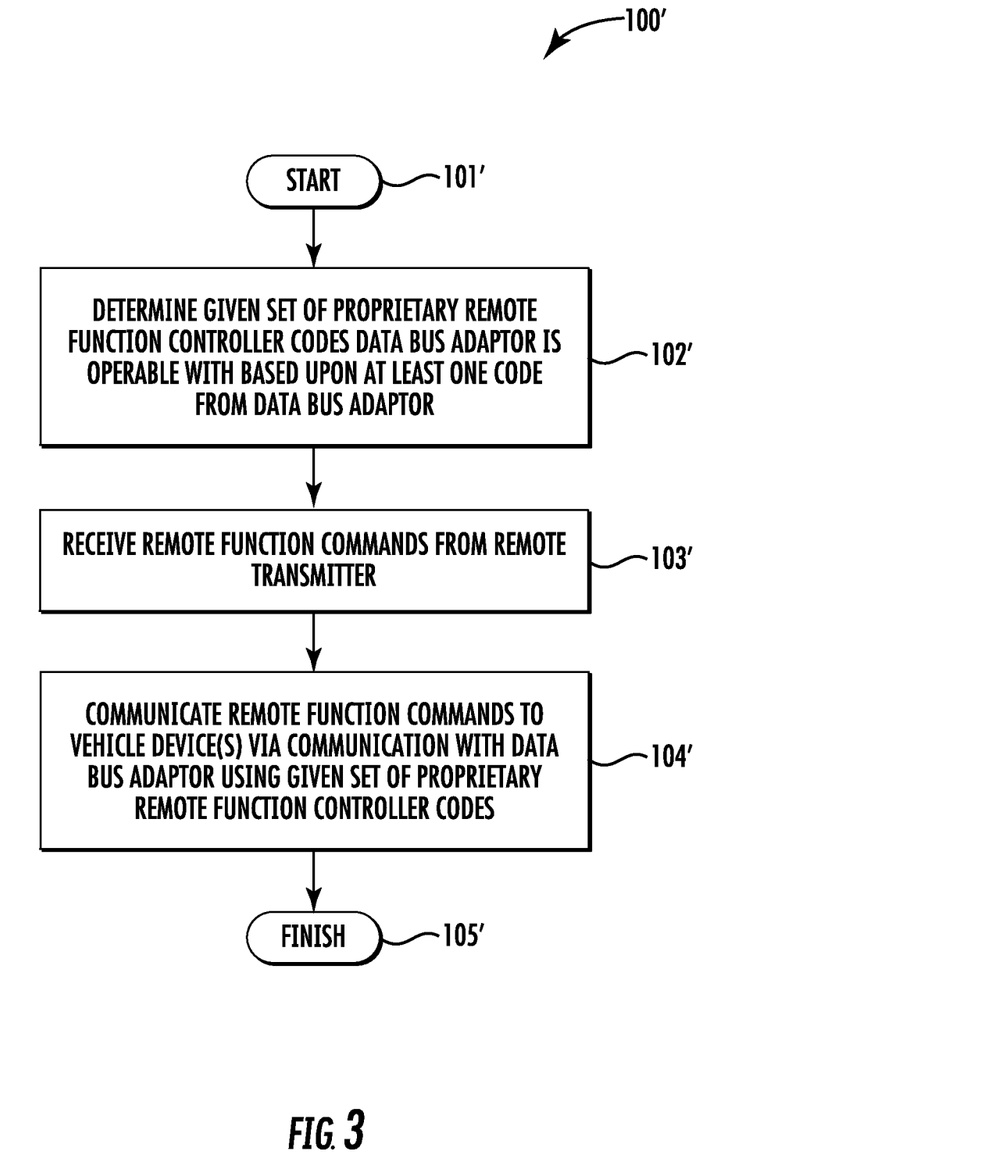

In another embodiment illustrated in the flow diagram 100' of FIG. 3, beginning at Block 101', the processor 31 of the multi-adaptor vehicle remote function controller 25 may determine the given set of controller codes based upon at least one controller code received from the data bus adaptor 33. For example, the processor 31 may compare a received controller code to those already stored in a look-up table (e.g., for a plurality of different proprietary communications formats) to thereby identify the particular manufacturer and/or code set being used by the data bus adaptor 33. Alternatively, the communication from the data bus adaptor 33 may include some other identifying code, voltage level, or other protocol characteristic that permits the processor 31 to determine the proper code set.

In accordance with one embodiment, the plurality of different sets of controller codes may be downloaded to or otherwise stored in the multi-adaptor remote function controller 25. In such case, the controller 25 may select the given set of controller codes to use with the data bus adaptor 33 based upon a software interface, or by automatic recognition. That is, the controller 25 may send test codes from the different sets of controller codes until an appropriate response is received from the data bus adaptor 33, indicating that the data bus adaptor recognizes and understands the particular test code and therefore that the particular test code is from the correct set of controller codes to use for communicating with the data bus adaptor. It should be noted that these approaches may also be used without first downloading all of the different sets of controller codes, that is, the entire correct set of controller codes may be downloaded after the correct set is discovered or determined based upon the software selection or test code recognition (in this case a relatively small set of test codes from each of the different sets of controller codes may be downloaded to the multi-adaptor vehicle remote function controller 35 downloaded before hand).

Similarly, the data bus adaptor 33 may also determine a desired set of vehicle device codes from among a plurality of different sets of vehicle device codes for different vehicles, e.g., based upon at least one code on the data communications bus 22 or other similar approaches to those discussed above. The remaining steps illustrated at Blocks 103'-105' of FIG. 3 are similar to those discussed above with respect to FIG. 2.

In yet other embodiments, a given set of controller specific and/or vehicle specific codes may be stored on a removable multi-adaptor vehicle remote function controller memory 34. The removable memory 34 may be separately programmed, either during manufacturing or installation, and then inserted into the data bus adaptor 14.

Figure 4:
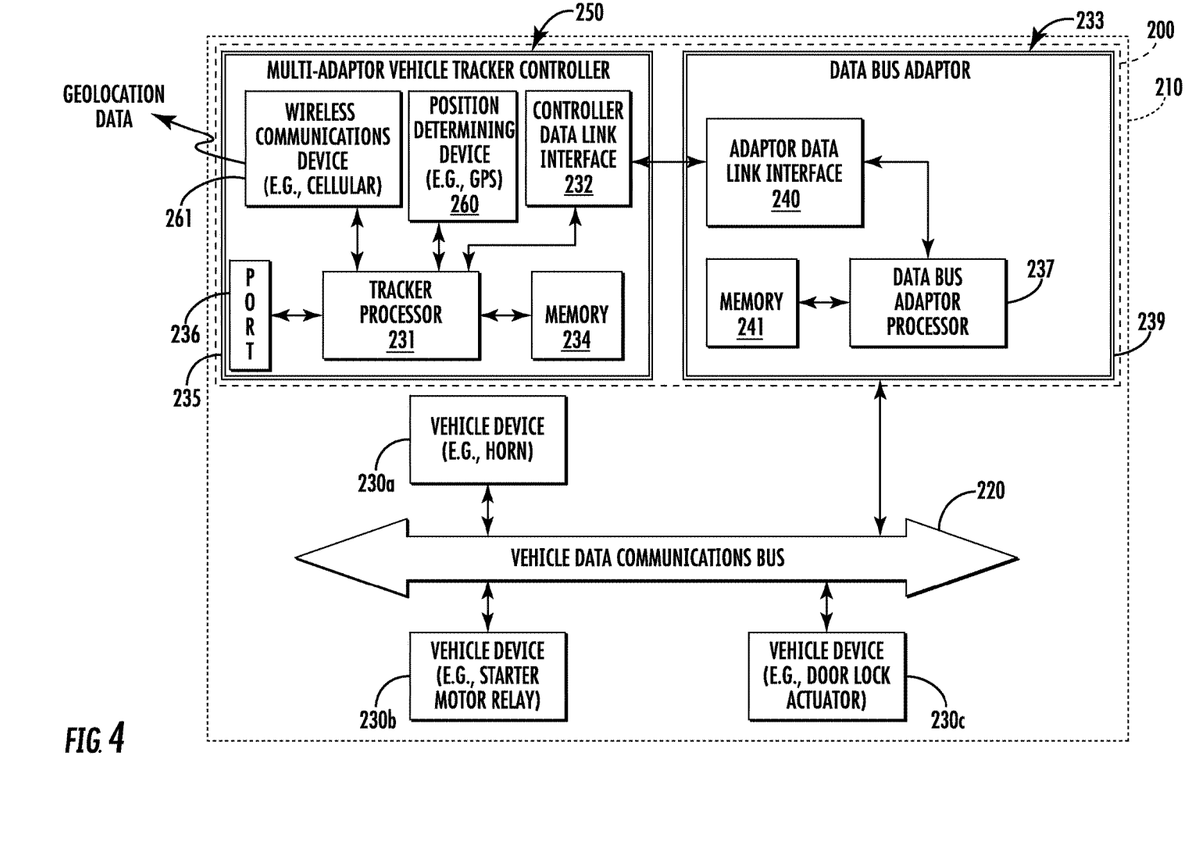
FIG. 4 is a block diagram of a vehicle remote control system in accordance with another example embodiment including a multi-adaptor vehicle tracker controller.
Figure 5:
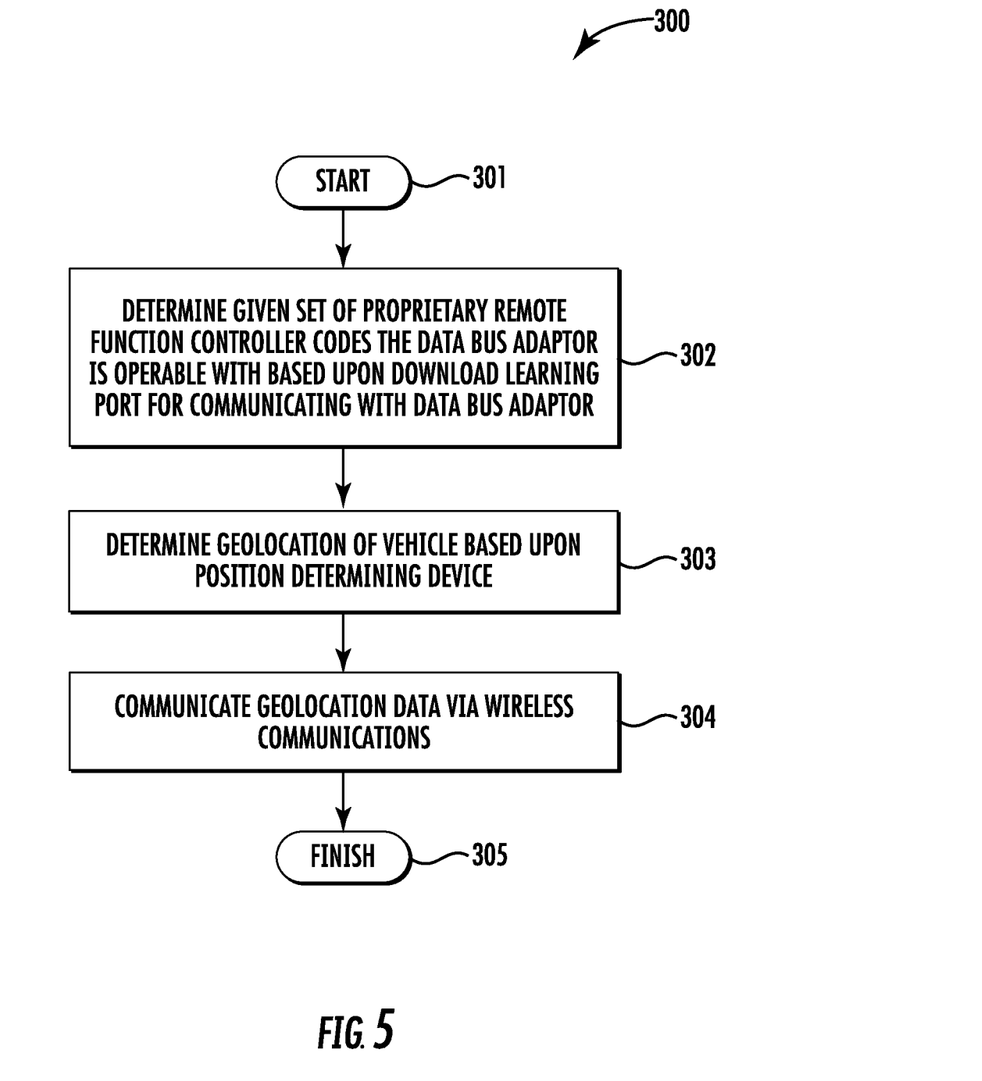
FIGS. 5 and 6 are flow diagrams illustrating method aspects associated with the system of FIG. 4.
Figure 6:
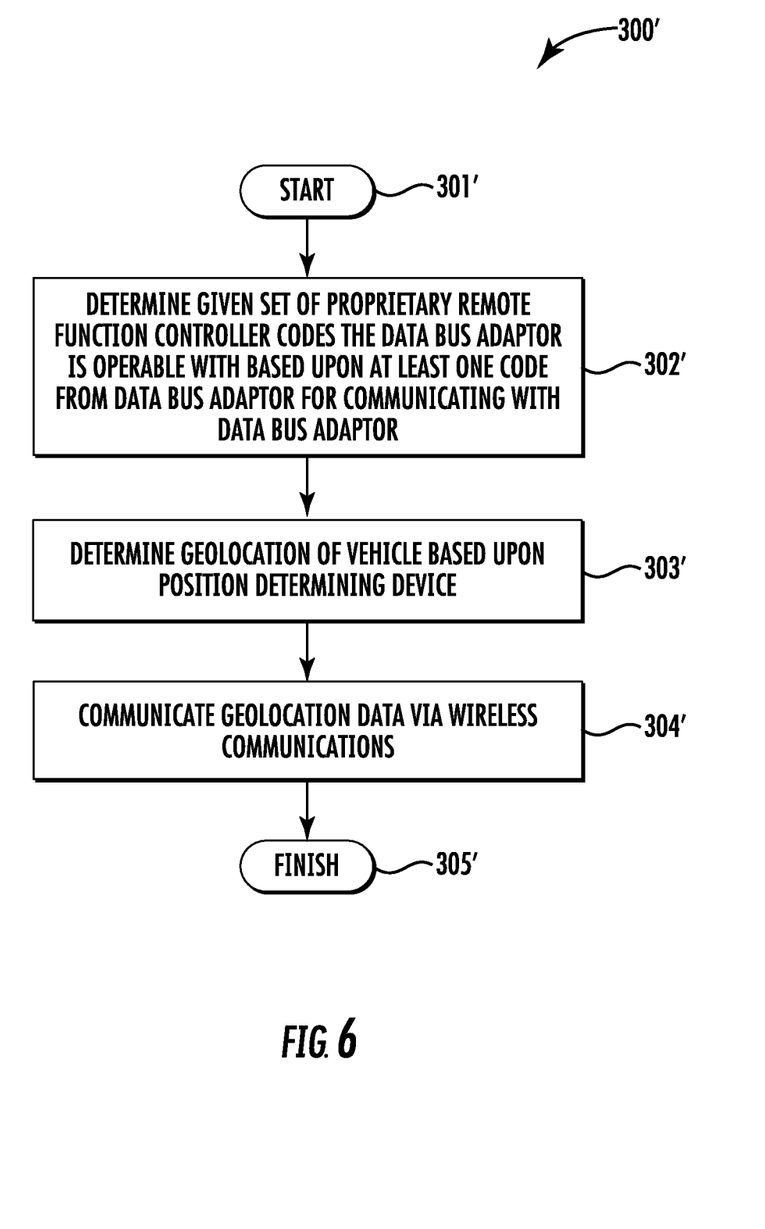

Turning now additionally to FIGS. 4-6, another example embodiment is for a vehicle tracker system 200 for a vehicle 210 of a type including a data communications bus 220 extending throughout the vehicle and connecting a plurality of vehicle devices 230a-230c within the vehicle, similar to those describe above. The vehicle tracker system 200 illustratively includes a multi-adaptor vehicle tracker controller 250 including a position determining device 260 for determining a geolocation of the vehicle 210, a wireless communications device 261, a controller data link interface 232, a download learning port 236, and a tracker processor 231 coupled to the position determining device, the wireless communications device, and the controller data link interface, and all of which are carried by a first housing 235.

As with the embodiments described above, the data bus adaptor 233 may be operable with a given set of proprietary remote function controller codes from among a plurality of different sets of proprietary remote function controller codes, and the tracker processor 231 may be operable with all of the different sets of proprietary remote function controller codes. Beginning at Block 301 of the flow diagram 300, the tracker processor 231 may determine the given set of proprietary remote function controller codes that the data bus adaptor is operable with based upon the download learning port 236, and use the given set of proprietary remote function controller codes for communications with the data bus adaptor, at Block 302. Here again, the port 236 may in some embodiments also be used by the controller data link interface 232 for communicating with the adaptor data link interface 240, or the adaptor data link interface may have its own dedicated port. The processor 231 may advantageously determine and communicate geolocation data (e.g., geospatial position data or coordinates) via the wireless communications device 261 based upon the position determining device 260, at Blocks 303-304, which illustratively concludes the method of FIG. 5 (Block 305). By way of example, the wireless communications device may be a cellular or wireless LAN device, and the position determining device may include a GPS receiver.

Similar to the above-described configurations, the multi-adaptor vehicle remote function controller 250 may further include a controller data link interface and a memory 234 coupled to the processor 231. The memory 234 may store the given set of proprietary remote function controller codes, and here again need not be a separate component from the processing circuit (i.e., the processor 231 and memory 234 may be integrated in a same chip or device). Furthermore, the various components of the multi-adaptor vehicle tracker controller 250 may be carried by a first housing 235, and the various components of the data bus adaptor 233 may be carried by a second housing 239. More particularly, the data bus adaptor 233 illustratively includes an adaptor data link interface 240, a memory 241, and a data bus adaptor processor 237, which are similar to the components described above with reference to FIG. 1 and therefore require no further discussion herein.

In a related configuration illustrated in the flow diagram 300' of FIG. 6, beginning at Block 301', the given set of proprietary remote function controller codes that the data bus adaptor is operable with may be determined or learned based upon at least one code from the data bus adaptor, rather than programming via the download learning port 236 (which need not be included in such embodiments). The remaining steps illustrated at Block 303'-305' are similar to those described above with reference to FIG. 5, and accordingly require no further discussion herein.

It should also be noted that in certain embodiments the multi-adaptor vehicle tracker controller 250 may also perform other vehicle remote functions in addition to the above-described vehicle geolocation and tracking operations. That is, the vehicle tracker controller 250 may also be used to control the vehicle devices 230-230c (e.g., horn, remote starting, door locking), as well as other vehicle devices/operations such as those described above. Moreover, the vehicle tracker controller 250 may also be responsive to a remote transmitter, similar to the multi-adaptor vehicle remote function controller 25.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A vehicle tracker system for a vehicle of a type including a data communications bus extending throughout the vehicle and connecting a plurality of vehicle devices within the vehicle, the remote control system comprising:
   a remote transmitter;
   a multi-adaptor vehicle tracker controller comprising
   a position determining device for determining a geolocation of the vehicle,
   a wireless communications device,
   a controller data link interface,
   a download learning port, and
   a processor coupled to said position determining device, said wireless communications device, and said controller data link interface, said processor for communicating geolocation data via said wireless communications device based upon said position determining device; and
   a data bus adaptor for adapting said multi-adaptor vehicle tracker controller to communicate via the data communications bus and comprising an adaptor data link interface coupled to said controller data link interface;
   said data bus adaptor operable with a given set of proprietary remote function controller codes from among a plurality of different sets of proprietary remote function controller codes;
   said processor being operable with the different sets of proprietary remote function controller codes, and configured to determine the given set of proprietary remote function controller codes that said data bus adaptor is operable with based upon said download learning port and use the given set of proprietary remote function controller codes for communications with said data bus adaptor to control the vehicle devices responsive to receiving remote function commands from said remote transmitter.

2. The vehicle tracker system of claim 1 wherein said multi-adaptor vehicle tracker controller further comprises a memory coupled to said processor for storing the given set of proprietary remote function controller codes.

3. The vehicle tracker system of claim 1 wherein said controller data link interface and said adaptor data link interface establish a serial data communications link there between.

4. The vehicle tracker system of claim 1 wherein said position determining device comprises a Global Positioning System (GPS) receiver.

5. The vehicle tracker system of claim 1 wherein said wireless communications device comprises a cellular communications device.

6. The vehicle tracker system of claim 1 wherein said multi-adaptor vehicle tracker controller comprises a first housing; and wherein said data bus adaptor comprises a second housing.

7. A multi-adaptor vehicle tracker controller for a vehicle tracker system comprising a data bus adaptor for adapting the multi-adaptor vehicle tracker controller to communicate via a data communications bus extending throughout a vehicle and connecting a plurality of vehicle devices within the vehicle, the data bus adaptor comprising an adaptor data link interface, and the data bus adaptor operable with a given set of proprietary remote function controller codes from among a plurality of different sets of proprietary remote function controller codes, said multi-adaptor vehicle tracker controller comprising:
- a position determining device for determining a geolocation of the vehicle;
- a wireless communications device;
- a controller data link interface to be coupled to the adaptor data link interface;
- a download learning port; and
- a processor coupled to said position determining device, said wireless communications device, said download learning port and said controller data link interface, said processor for communicating geolocation data via said wireless communications device based upon said position determining device;
- said processor being operable with the different sets of proprietary remote function controller codes, and configured to determine the given set of proprietary remote function controller codes that said data bus adaptor is operable with based upon said download learning port and use the given set of proprietary remote function controller codes for communications with said data bus adaptor to control the vehicle devices responsive to receiving remote function commands from a remote transmitter.

8. The multi-adaptor vehicle tracker controller of claim 7 further comprising a memory coupled to said processor for storing the given set of proprietary remote function controller codes.

9. The multi-adaptor vehicle tracker controller of claim 7 wherein said controller data link interface and said adaptor data link interface establish a serial data communications link there between.

10. The multi-adaptor vehicle tracker controller of claim 7 wherein said position determining device comprises a Global Positioning System (GPS) receiver.

11. The multi-adaptor vehicle tracker controller of claim 7 wherein said wireless communications device comprises a cellular communications device.

12. A method for using a vehicle tracker system for a vehicle of a type including a data communications bus extending throughout the vehicle and connecting a plurality of vehicle devices within the vehicle, the remote control system comprising a multi-adaptor vehicle tracker controller comprising a position determining device for determining a geolocation of the vehicle, a wireless communications device, a controller data link interface, and a download learning port, and the remote control system further comprising a data bus adaptor for adapting the multi-adaptor vehicle tracker controller to communicate via the data communications bus and comprising an adaptor data link interface coupled to the controller data link interface, the data bus adaptor operable with a given set of proprietary remote function controller codes from among a plurality of different sets of proprietary remote function controller codes and the multi-adaptor vehicle tracker controller being operable with the different sets of proprietary remote function controller codes, the method comprising:
at the multi-adaptor vehicle tracker controller,
- communicating geolocation data via the wireless communications device based upon the position determining device,
- determining the given set of proprietary remote function controller codes that the data bus adaptor is operable with based upon the download learning port, and
- using the given set of proprietary remote function controller codes for communications with the data bus adaptor to control the vehicle devices responsive to receiving remote function commands from said remote transmitter.

13. The method of claim 12 wherein the multi-adaptor vehicle tracker controller further comprises a memory coupled to the processor for storing the given set of proprietary remote function controller codes.

14. The method of claim 12 wherein the controller data link interface and the adaptor data link interface establish a serial data communications link there between.

15. The method of claim 12 wherein the position determining device comprises a Global Positioning System (GPS) receiver.

16. The method of claim 12 wherein the wireless communications device comprises a cellular communications device.

17. A vehicle tracker system for a vehicle of a type including a data communications bus extending throughout the vehicle and connecting a plurality of vehicle devices within the vehicle, the remote control system comprising:
- a multi-adaptor vehicle tracker controller comprising
- a position determining device for determining a geolocation of the vehicle,
- a wireless communications device,
- a controller data link interface, and
- a processor coupled to said position determining device, said wireless communications device, and said controller data link interface, said processor for communicating geolocation data via said wireless communications device based upon said position determining device; and
- a data bus adaptor for adapting said multi-adaptor vehicle tracker controller to communicate via the data communications bus and comprising an adaptor data link interface coupled to said controller data link interface;
- said data bus adaptor operable with a given set of proprietary remote function controller codes from among a plurality of different sets of proprietary remote function controller codes;
- said processor being operable with the different sets of proprietary remote function controller codes, and configured to cause the data bus adaptor to provide at least one code,
- determine the given set of proprietary remote function controller codes that said data bus adaptor is operable with based upon the least one code from said data bus adaptor and,
- use the given set of proprietary remote function controller codes for communications with said data bus adaptor to control the vehicle devices responsive to receiving remote function commands from said remote transmitter.

18. The vehicle tracker system of claim 17 wherein said multi-adaptor vehicle tracker controller further comprises a memory coupled to said processor for storing the given set of proprietary remote function controller codes.

19. The vehicle tracker system of claim 17 wherein said controller data link interface and said adaptor data link interface establish a serial data communications link there between.

20. The vehicle tracker system of claim 17 wherein said position determining device comprises a Global Positioning System (GPS) receiver.

21. The vehicle tracker system of claim 17 wherein said wireless communications device comprises a cellular communications device.

22. The vehicle tracker system of claim 17 wherein said multi-adaptor vehicle tracker controller comprises a first housing; and wherein said data bus adaptor comprises a second housing.

23. A multi-adaptor vehicle tracker controller for a vehicle tracker system comprising a data bus adaptor for adapting the multi-adaptor vehicle tracker controller to communicate via a data communications bus extending throughout a vehicle and connecting a plurality of vehicle devices within the vehicle, the data bus adaptor comprising an adaptor data link interface, and the data bus adaptor operable with a given set of proprietary remote function controller codes from among a plurality of different sets of proprietary remote function controller codes, said multi-adaptor vehicle tracker controller comprising:
- a position determining device for determining a geolocation of the vehicle;
- a wireless communications device;
- a controller data link interface to be coupled to the adaptor data link interface; and
- a processor coupled to said position determining device, said wireless communications device, said download learning port and said controller data link interface, said processor for communicating geolocation data via said wireless communications device based upon said position determining device;
- said processor being operable with the different sets of proprietary remote function controller codes, and configured to
- cause the data bus adaptor to provide at least one code,
- determine the given set of proprietary remote function controller codes that said data bus adaptor is operable with based upon the at least one code from the data bus adaptor, and
- use the given set of proprietary remote function controller codes for communications with said data bus adaptor to control the vehicle devices responsive to receiving remote function commands from said remote transmitter.

24. The multi-adaptor vehicle tracker controller of claim 23 further comprising a memory coupled to said processor for storing the given set of proprietary remote function controller codes.

25. The multi-adaptor vehicle tracker controller of claim 23 wherein said controller data link interface and said adaptor data link interface establish a serial data communications link there between.

26. The multi-adaptor vehicle tracker controller of claim 23 wherein said position determining device comprises a Global Positioning System (GPS) receiver.

27. The multi-adaptor vehicle tracker controller of claim 23 wherein said wireless communications device comprises a cellular communications device.

28. A method for using a vehicle tracker system for a vehicle of a type including a data communications bus extending throughout the vehicle and connecting a plurality of vehicle devices within the vehicle, the remote control system comprising a multi-adaptor vehicle tracker controller comprising a position determining device for determining a geolocation of the vehicle, a wireless communications device, a controller data link interface, and a download learning port, and the remote control system further comprising a data bus adaptor for adapting the multi-adaptor vehicle tracker controller to communicate via the data communications bus and comprising an adaptor data link interface coupled to the controller data link interface, the data bus adaptor operable with a given set of proprietary remote function controller codes from among a plurality of different sets of proprietary remote function controller codes and the multi-adaptor vehicle tracker controller being operable with the different sets of proprietary remote function controller codes, the method comprising:
- at the multi-adaptor vehicle tracker controller,
- communicating geolocation data via the wireless communications device based upon the position determining device,
- causing the data bus adaptor to provide at least one code,
- determining the given set of proprietary remote function controller codes that the data bus adaptor is operable with based upon the at least one code from the data bus adaptor, and
- using the given set of proprietary remote function controller codes for communications with the data bus adaptor to control the vehicle devices responsive to receiving remote function commands from said remote transmitter.

29. The method of claim 28 wherein the multi-adaptor vehicle tracker controller further comprises a memory coupled to the processor for storing the given set of proprietary remote function controller codes.

30. The method of claim 28 wherein the controller data link interface and the adaptor data link interface establish a serial data communications link there between.

31. The method of claim 28 wherein the position determining device comprises a Global Positioning System (GPS) receiver.

32. The method of claim 28 wherein the wireless communications device comprises a cellular communications device.

* * * * *

UNITED STATES PATENT AND TRADEMARK OFFICE
CERTIFICATE OF CORRECTION

PATENT NO. : 10,127,174 B2
APPLICATION NO. : 14/944497
DATED : November 13, 2018
INVENTOR(S) : Kenneth E. Flick It is certified that error appears in the above-identified patent and that said Letters Patent is hereby corrected as shown below:

In the Claims

| | |
|---|---|
| Column 8, bridging Lines 48-49, Claim 3 | Delete: "there between" Insert: --therebetween-- |
| Column 9, Line 33, Claim 9 | Delete: "there between" Insert: --therebetween-- |
| Column 10, Line 10, Claim 14 | Delete: "there between" Insert: --therebetween-- |
| Column 10, bridging Lines 60-61, Claim 19 | Delete: "there between" Insert: --therebetween-- |
| Column 11, Line 47, Claim 25 | Delete: "there between" Insert: --therebetween-- |
| Column 12, Line 43, Claim 30 | Delete: "there between" Insert: --therebetween-- |

Signed and Sealed this
First Day of January, 2019

Andrei Iancu
*Director of the United States Patent and Trademark Office*